US006922710B2

(12) United States Patent
Child et al.

(10) Patent No.: US 6,922,710 B2
(45) Date of Patent: Jul. 26, 2005

(54) HAND-HELD CALCULATOR WITH PROBLEMS AND OPERATIONS LINKED LISTS

(75) Inventors: J. Douglas Child, Maitland, FL (US); Malgorzata A. Brothers, Plano, TX (US); Todd Fortenberry, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 501 days.

(21) Appl. No.: 10/035,735

(22) Filed: Nov. 8, 2001

(65) Prior Publication Data

US 2003/0088596 A1 May 8, 2003

(51) Int. Cl.[7] .................................................. G06F 3/00
(52) U.S. Cl. ........................................ 708/162; 708/145
(58) Field of Search ............................... 708/162, 144, 708/145, 146, 164, 168, 174; 434/201

(56) References Cited

U.S. PATENT DOCUMENTS

| | | | | |
|---|---|---|---|---|
| 4,845,652 A | * | 7/1989 | Bunsen | 708/144 |
| 5,007,008 A | * | 4/1991 | Beers | 708/145 |
| 5,067,102 A | * | 11/1991 | Eisenstein | 708/142 |
| 5,377,130 A | * | 12/1994 | Frank et al. | 708/142 |
| 5,432,721 A | * | 7/1995 | Satoh | 708/168 |
| 5,469,538 A | * | 11/1995 | Razdow | 345/440 |
| 5,526,475 A | * | 6/1996 | Razdow | 708/490 |
| 5,532,946 A | * | 7/1996 | Phipps et al. | 708/174 |
| 5,594,673 A | * | 1/1997 | Coffin | 708/145 |
| 5,627,914 A | * | 5/1997 | Pagallo | 708/446 |
| 5,870,319 A | * | 2/1999 | Thornton et al. | 708/160 |
| 6,243,726 B1 | * | 6/2001 | Satoh | 708/520 |
| 6,549,923 B1 | * | 4/2003 | Sudoh | 708/162 |

\* cited by examiner

*Primary Examiner*—Tan V. Mai
(74) *Attorney, Agent, or Firm*—J. Dennis Moore; W. James Brady, III; Frederick J. Telecky, Jr.

(57) ABSTRACT

A hand-held calculator programmed to teach mathematics in a manner which emulates traditional step-by-step teacher-student teaching methods and shows the important intermediate steps. Using linked lists, the method allows the use of selected data sets of problems and provides choices of mathematical operations, including transformations which are applicable or can operate on a selected problem. Importantly, the choices available to the student will not always lead to a solution or simplification of the problem. This allows the student to see the effect of an improper choice, as well as a proper choice.

23 Claims, 5 Drawing Sheets

HAND-HELD CALCULATOR WITH PROBLEMS AND OPERATIONS LINKED LISTS

This application is related to the Texas Instruments Application having Ser. No. 60/344,603 filed the same day as the present application and having at least one common inventor, and also Texas Instruments Application filed on Aug. 24, 2001 and having Ser. No. 09/939,128.

FIELD OF THE INVENTION

This invention relates to software or firmware for use with electronic calculators, and more particularly, to a calculator having a CAS (Computer Algebra System) for enhancing the teaching of mathematics by using a basic data structure that emulates the way mathematics is traditionally taught. The invention also allows easy transfer or sharing of problem data with other students using similar calculators.

BACKGROUND OF THE INVENTION

Electronic calculators have become a common tool for teaching students various phases of mathematics. In particular, the features of graphing calculators result in their use in the classroom as providing significant advantages. Graphing calculators are characterized by a large screen, which permits the entry of mathematic expressions in traditional format and also allows multi-lines of information. These graphing calculators also permit displays of graphs, display of tables and rather complex programming. Preferred graphing calculators also permit data transmission to other computing devices, directly or by means of a data storage medium as well as data collection by means of various interface protocols. Many calculator models are designed for particular education levels, however, regardless of the level for which a calculator is designed, a usual goal is to provide a logical and easy to use interface with the student. Two commercially available calculators which are particularly suitable as teaching tools are the "TI-89" and "TI-92 Plus" Graphing Calculators available from Texas Instruments Incorporated of Dallas, Tex.

SUMMARY OF THE INVENTION

The present invention seeks to help students of mathematics learn the symbolic aspects of algebra and calculus by helping them to use definitions and theorems to solve calculation problems based on such symbolic aspects, and obtain textbook-like solutions. The invention helps the students analyze the structure of the mathematical problems they are working with, the possible operation (also referred herein as transformations) that can be applied to those problems, and the results of applying selected operations to a problem.

Embodiments of the present invention are described herein with respect to a graphing calculator that allows the user to step through the solution of a mathematical problem. The user interface of the calculator helps the student to more readily learn problem solutions and the mathematical theory and steps involved. Similarly, the embodiments of this invention also include the same user interface functionality of a selected calculator in a software application package that is also executed on the graphing calculator or hand-held device.

More specifically, the present invention discloses a hand-held computing device and methods for teaching procedures for solving mathematical problems (including the various mathematical expressions which make up the problem), and primarily, mathematical problems (or expressions making up the problem) containing algebraic expressions. A hand-held calculator which includes the features of the invention will comprise a processor unit for performing basic mathematical operations, most if not all of the basic mathematical operations will be standard in most hand-held calculators. However, the processor of the calculator used for this invention also allows for entry of algebraic expression in their traditional form and manipulation of the expressions. The calculator will typically include one or more memory units that provide first memory areas for storing a master list of mathematical operations that can be performed by the processor. The memory will also typically include second memory areas for storing one or more linked lists of mathematical problems which may include algebraic expressions and which will be referred to as a problem data set. The memory will also store-linked lists of mathematical operations selected from the master list of mathematical operations, and which may be referred to as an "operations" linked list. The mathematical operations on this second or "operations" linked list will include mathematical operations which may be applicable to the solution or used to operate on a selected problem from the problem data set. It should be noted, however, that the "operations" linked list may include any type of mathematical operation (i.e. transformations) which may be applied to a particular problem even though operation or application of that operation with respect to the problem, will not lead to a solution of the problem. Thus, the mathematic student is allowed to fail in solving the problem if he selects the wrong mathematical operation. The preferred computer device will also include a display for displaying multi-lines of information related to the selected mathematical problem and expressions making up the problem. The multi-lines of display may display the actual problem (expression) in tradition format as well as the available "operations" linked list of mathematical operations. A typical keyboard is also included for inputting information related to the mathematical problems and for selecting a mathematical operation to be performed on the selected mathematical problem. From the above discussion, it will be appreciated that the selected operation is selected from the "operations" linked list.

When the computer and the method of this invention is used for teaching, the student or user will first select a set of mathematical problems from one or more linked lists of mathematical problems. Each one of the linked lists of problems may for example focus on a specific mathematical area or transformation. Alternately, problem lists may include problems that encompass broad areas of mathematical theory. Further, if desired, the student may add certain problems to the list, delete problems or even change problems. Once the list of multiple problems is selected, the student will then select one of the problems in the list to be solved. Upon selection of the problem to be solved, the computer will generate the "operations" linked list which will include a series of possible mathematical operations that can be applied and used to operate on the selected mathematical problem. As stated above, this list may include operations which will transform the format of the selected problem, but will not lead to a final solution. The "operations" linked list which represents a subset of all possible mathematical operations performable by the hand-held calculator is then displayed in a manner which allows selection of one of the available mathematical operations (including transformations). The student will then choose by any suitable method known in the art which of the displayed mathematical operations will be applied to the problem. The student may also, as an example, isolate a mathematical sub-expression contained in the problem for solution or transformation. Upon selection of the operation to be applied, the computer will then operate on the selected mathematical problem (sub-expression) with the selected operation. The computer will then display the results of applying the mathematical operation to the problem or expression such that the student can see the effect of the operation and transformation. If the selected problem is extremely simple, selection of a proper mathematical operation applied to the problem may result in a final solution. However, typically the first operation will simply move the problem toward a solution. Therefore, the problem, mathematical expression, sub-expression or equation resulting from application of a mathematical operation will again be evaluated to determine whether the obtained results are subject to further operations. If so, the process repeats itself and another "operations" linked list is presented or displayed for the student to select a second operation (transformation) for application to the problem. Upon again choosing one of the possible mathematical operations, the computer will again apply the mathematical operation to the existing problem (previously obtained results) and come up with a second result which presumably will have moved the problem even closer to a final answer. Again, it is important to note that the student may make an unwise choice and not move the problem closer to a final solution. This process will continue until there are no longer any operations which when applied will further solve or simplify the problem.

In addition to selecting a problem set and then selecting a problem from the selected problem set for solution as described above, the process of the present invention will also display menus for manipulating the various problem sets by adding to the problem sets, loading or entering new problem sets, changing the type of problem sets or changing the names of a problem set. In addition, once a problem set is selected, individual problems may be added, removed or the original problems changed as desired by the teacher or the student. A preferred computer used for this invention will also include an input/output port such that the hand-held calculator may be connected to another computing device, such as another student's calculator or a personal computer. Thus, new problems or data may be provided by the instructor for downloading additional problems. Therefore, there has been described apparatus and methods for teaching students mathematical theories and operations using a problem data set structure for organizing the types of problems and the various problems which may be included in the data set.

BRIEF DESCRIPTION OF THE DRAWINGS

The above features as well as other features of the present invention will be more clearly understood from the consideration of the following description in connection with the accompanying drawings in which.

DESCRIPTION OF PREFERRED EMBODIMENTS

Figure 1A:
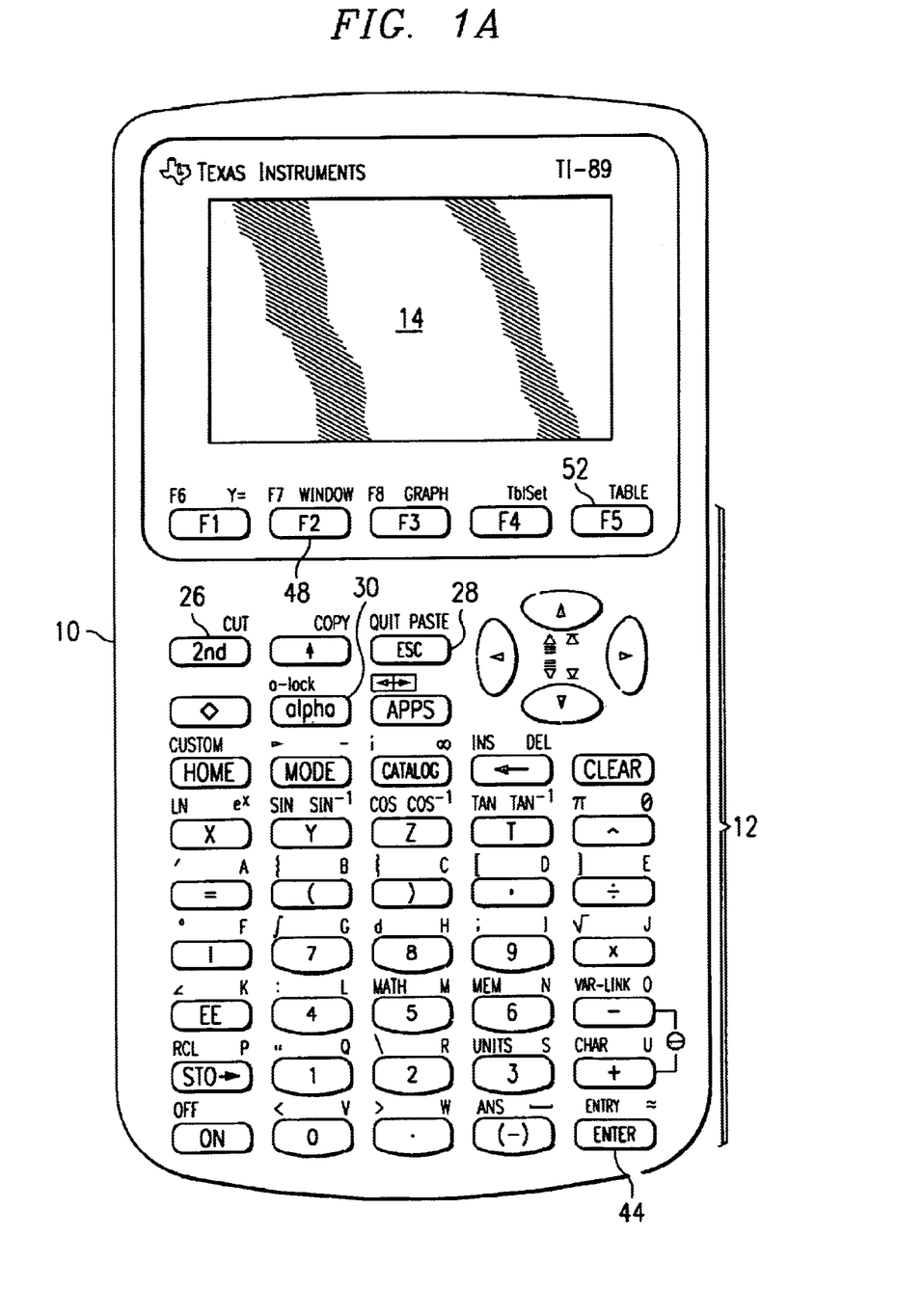
FIG. 1A illustrates the front panel of a calculator suitable for use with the invention.

FIG. 1A illustrates a calculator 10 incorporating the features of the present invention and having a keyboard or front panel 12. Calculator 10 is described herein in terms of particular software and features of the commercially available TI-89 Graphing Calculator manufactured by Texas Instruments Incorporated. Apart from the features of the present invention as they relate to the TI-89 calculator 10, many of the features of calculator 10 described herein are typical of graphing calculators, while other features are unique to the "TI-89" and "TI-92 Plus" family of TI calculators. The use of the TI-89 calculator 10 is for purposes of description, and is not intended to limit the invention, as the features that are the subject of the present invention may be incorporated into other calculators having graphical displays.

Figure 1B:
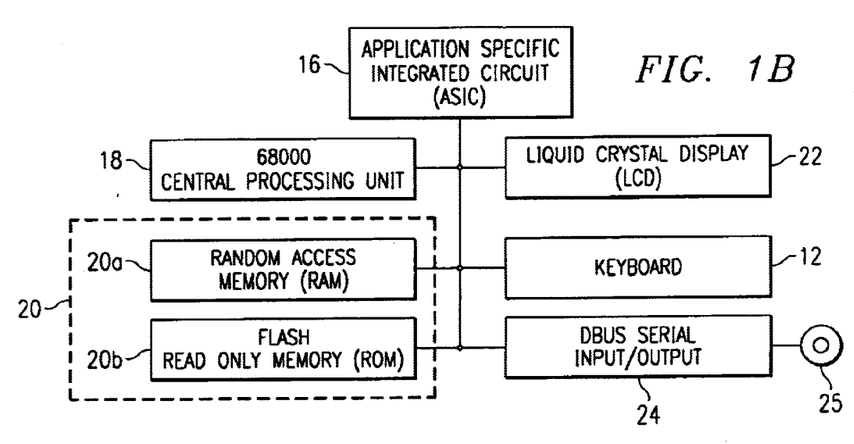
FIG. 1B shows a block diagram of the circuitry of the calculator of FIG. 1A suitable for programming with the features of this invention.

As shown in FIG. 1A, the screen 14 of calculator 10 may be used to provide a "graphical display." However, in addition to the ability to draw graphical displays of various types, the screen 14 may also be used to display multi-lines of data, each data line of which for purposes of this invention may preferably display a series of equations in traditional format as a problem is solved. Other typical features of a graphing calculator 10 includes programmable software/firmware applications, loading and storage programming and keystroke programming. The calculator also permits data collection displays and analysis. As shown in FIG. 1A, a typical screen 14 may include on the order of 100–160 pixels. Keypad 12 has various keys for data and command entries which are used to control the calculator when used to implement the invention as described herein. Also as shown in FIG. 1B, the calculator includes a processor 18 connected to a memory unit 20, such as for example, a 256K byte RAM 20A and a 721K byte flash ROM 20B. Other circuits include a display 22 such as an LCD (Liquid Crystal Display) and its driver circuit, an input/output data bus 24, and an input/output port 25. The input/output data bus 24 and the input/output port 25 provide an interface for data linking with a unit-to-unit link cable connection capability. Finally, there will also typically be included on ASIC 16, which contains all of the interface logic that allows the different components to communicate with each other. ASIC 16 may also include specialized register for system control.

As is typical of many calculators, calculator 10 has a secondary function key shown as $2^{nd}$ key 26 which permits selected keys to have at least two functions. For example, if the ESC/QUIT key 28 alone is pressed, the calculator performs the ESC function. However, if the $2^{nd}$ key 26 is first pressed and followed by the ESC/QUIT key 28, the calculator will perform the QUIT function. It is also noted that key 28 may act as the "paste" key when the calculator is in a cut and paste mode. For simplicity of explanation herein, a key having two or more functions is referred to in terms of the function appropriate for the context. That is, when discussing the QUIT function, the ESC/QUIT key 26 is referred to as the QUIT key. Similarly, calculator 10 also has an alpha key 30 which when depressed makes the other keys subsequently depressed to input an alpha character.

Figure 2A:
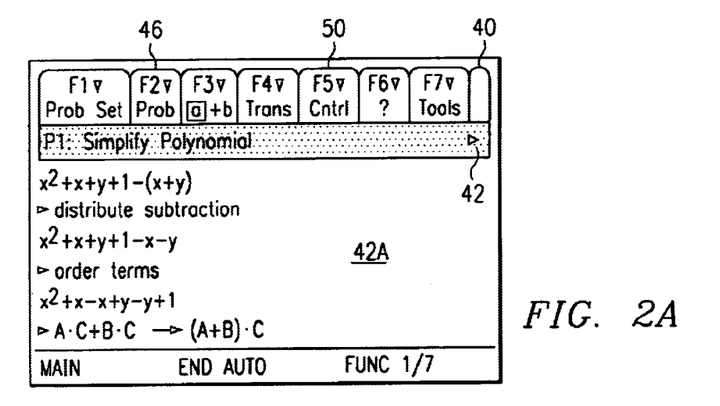
FIGS. 2A through 2G illustrate examples of screen displays of various embodiments of the present invention.

Referring now to FIGS. 2A through 2G, there are illustrated screen displays typical for the calculator illustrated in FIG. 1 while running an application called symbolic math guide ("SMG"), which incorporates a system for interactive transformation of expressions and/or sub-expressions of mathematical equations. The symbolic math guide provides step-by-step problem solving transformations for various mathematical problem types such as algebra and calculus. This helps students learn symbolic computation. As an example, 8 FIG. 2A illustrates a typical computer screen showing menus as well as the history of a problem chosen for solution. As shown and as an example only, the screen includes a menu tab selection line 40 with tabs F1, F2, F5 and F7. The above-mentioned tabs will be discussed below, but it should be understand that other tabs and other possible manipulations of the menu may be made available by the computer. In the embodiment shown, a statement of the type of problem to be solved such as simplifying a polynomial, expanding a polynomial or simply solving the problem, etc., is displayed in display area 42. Below the problem statement displayed in area 42, there is also included a multi-line area 42A for displaying the actual problem being solved followed by a display of the step-by-step solution.

Figure 2B:
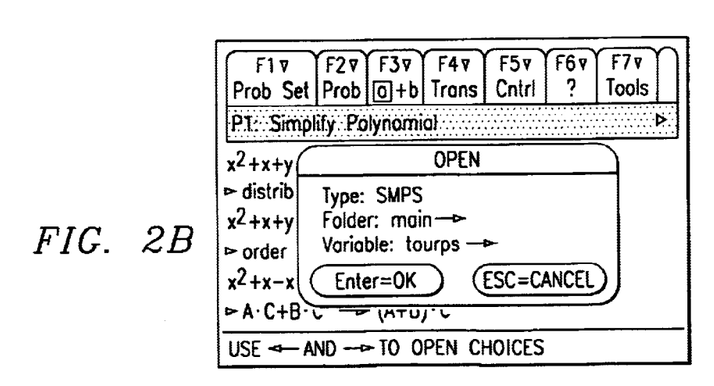
Figure 2C:
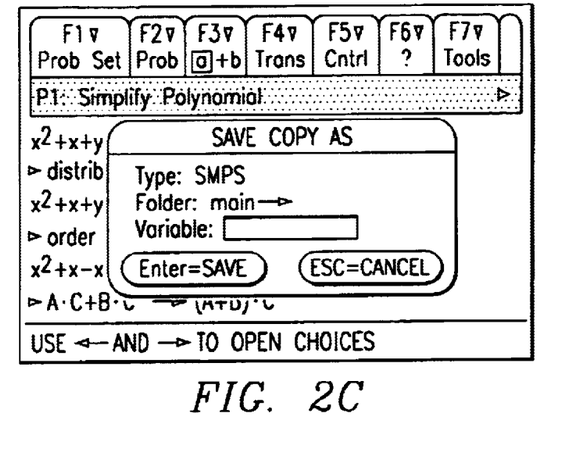
Figure 2D:
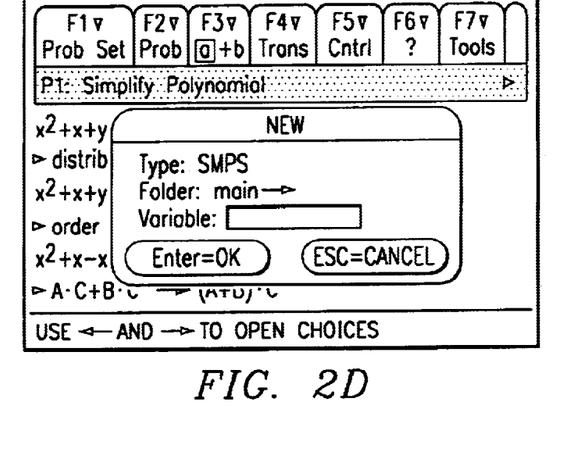

As shown in FIG. 2B, one of the options available from the menu tab selection line 40, as an example only, is to "open" a "problem set" of the type SMPS (symbolic math problem set) loaded in a main folder and which includes a variable "TOURPS." If other problem sets are available, the user may scroll through the various "problem sets" which are available until the desired problem set appears. The operator or student then presses the ENTER key 44 as shown in FIG. 1 to select the particular problem set or presses the ESC key 28 to continue reviewing other problem sets. Other menu operations available under the problem set menu include "Save Copy As," "New Problem Set," and if desired, a procedure for selecting a limit on the number of problems in the problem set may be executed. The examples of the screens which may appear while using this problem set tab key F1 are illustrated in FIGS. 2B, 2C, 2D and 2E, respectively.

Referring again to FIG. 2A, once the "problem set" is selected or "opened" by the operator by pressing the ENTER key 44, the user may then select the "problem" tab 46 as shown in FIG. 2A by pressing the F2 key indicated by reference numeral 48 in FIG. 1. Pressing the F2 key 48 allows the user to manage the selected problem set by applying a new problem at the end of the problem set, inserting a new problem at a location between other problems in the problem set, deleting selected problems and also cutting, copying and/or pasting problems from one problem set to another problem set.

There is also indicated a control tab 50 in the menu line on FIG. 2A which is selected by pressing the F5 key 52 as shown in FIG. 1. According to the present invention, use of the control tab key allows a user to select problems from one or more existing "problem sets" and then create a new problem set from the various selections.

Figure 2E:
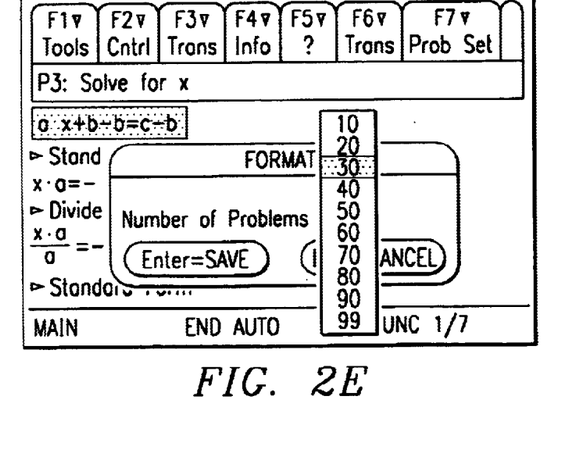
Figure 2F:
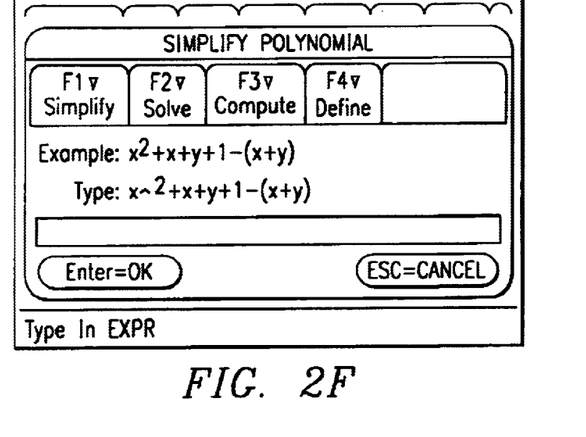
Figure 2G:
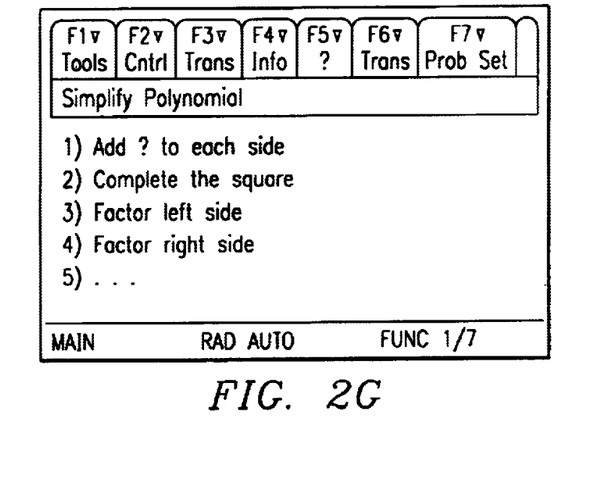
Figure 2H:
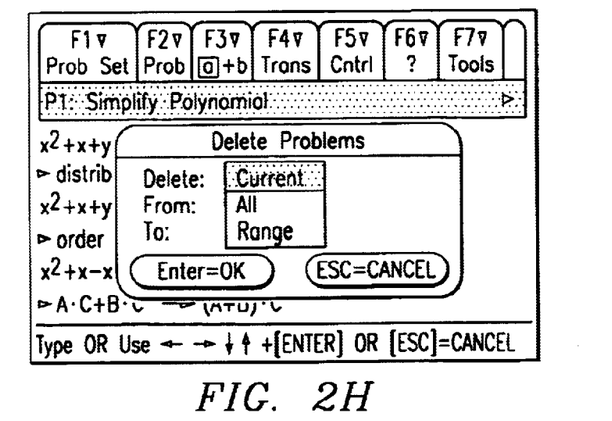

Eventually, as will be appreciated, a particular problem or mathematical expression which constitutes a part of the problem will be selected for solving, expanding or simplifying, etc. from one or more linked-list of problems, such as for example, the SMPS set of problems as indicated in FIG. 2B and referred to as "problem" linked list. The selected problem will then be displayed in area 42A of the multi-line display screen 14 of calculator 10. The calculator will then evaluate the problem or mathematical expression and determine which mathematical operation selected from those operations which are performable by the calculator are applicable or will operate on the selected problem. All of the possible operations performable by the calculator are referred to as the master list and may or may not represent an actual list stored in memory. One or more of the applicable operations are then stored in the memory as a linked list. In the embodiment shown and illustrated in FIG. 2F, the tab keys may also be defined so as to provide a list of the types of problems that may be solved such as "simplify" (as shown in 2A through 2D, 2H and 2G), "solve" (as shown in FIG. 2E) and "compute" (derivatives). The appropriate action to be taken is determined by selecting the appropriate "F" key associated with its tab. Assuming the "F1" "simplify" key is selected, a drop down menu will then be displayed (not shown) which illustrates the type of problems that can be simplified. The operator then enters a problem to be solved and subsequently selects the "TRANS" (transformation) key. At this point, a linked list of mathematical operations, including transformations such as "complete the square," "factor" or expansion, which are applicable, can operate on or manipulate the problem or mathematical expression as shown in FIG. 2G. The linked list is referred to herein as an "operations" linked list and may include operations which will not simplify or lead to a solution of the problem or mathematical expression. This allows the student to make wrong choices as well as correct choices and to see the effect of such wrong choices.

When the student makes a choice from the displayed linked list (a right choice or a wrong choice), the calculator will then operate on the selected problem or mathematical expression according to the student's choice. The results or the effect of the operation on the problem is then displayed on a line in display area 42A. That is, the problem (expression) operated on is rewritten or displayed with the changes. After the problem (or selected algebraic expression which makes up part of the problem) is displayed with the results of the previous operation, the calculator will then again determine which of the operations available from the master list are now applicable to the rewritten problem or mathematical expression, and a new linked list of possible operations is displayed. The new linked list may include operations which were not applicable in the previous pass and consequently were not displayed. If the previous operation was with respect to a mathematical or algebraic subexpression which made up part of the overall problem and has now been simplified as far as possible, the student may choose another and separate sub-expression which also makes up the problem or may now chose an operation which operates on the whole problem.

Figure 3:
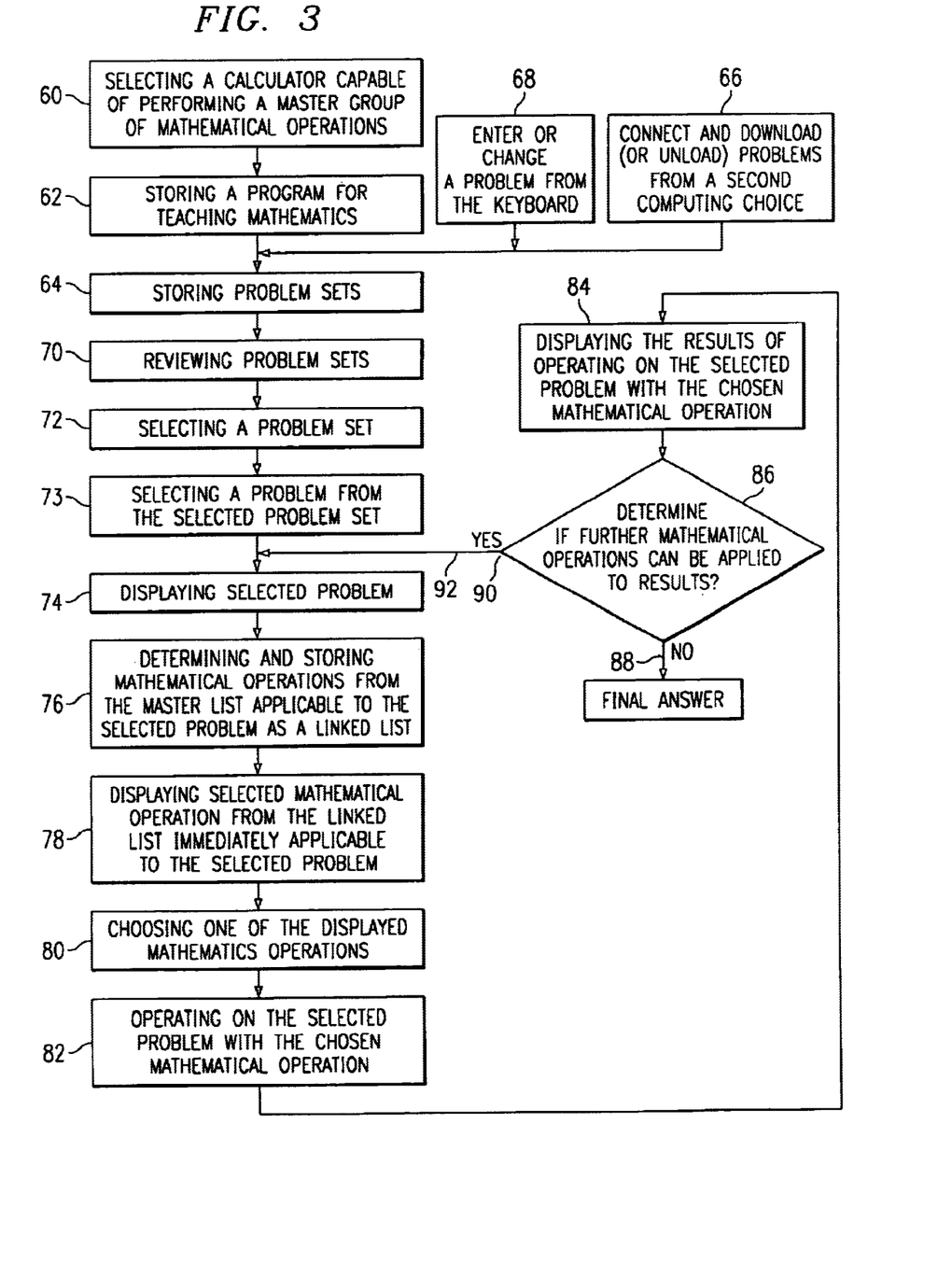
FIG. 3 is a flow diagram showing the process steps used by the calculator of this invention.

Referring now to FIG. 3, there is shown a flow diagram illustrating the steps for solving a problem or mathematical expression according to the teachings of the present invention. As shown at step 60, a calculator 10 such as a "TI-89" or "TI-92 Plus" graphing calculator is provided as discussed above. Importantly, the calculator has the capability of performing a master group of mathematical operations, (i.e. transformation) such as simplification and expansion. The calculator is also capable of storing a program (software or firmware) for teaching mathematics according to the teachings of the invention as indicated at step 62. An area of memory then receives and stores at least one liked list of mathematical problem, which are referred to herein as "problem" linked lists. This step is indicated at step 64, and as is also shown, the linked lists of problems may be downloaded or uploaded from or to another computer connected to an input/output port as shown at 66. Other problem sets may be entered from the keyboard as shown in step 68. The available problem sets are then received as shown in step 70, and then one of the "problem" linked lists or sets is selected as indicated at step 72. Once a problem set is chosen, a problem from the set is selected as indicated at step 73 and then displayed on the screen 14 as indicated at step 74. The mathematical operations available in the master group, which are applicable or can "operate" on the chosen problem (or a portion of the problem or sub-expression), are then stored in memory as a linked list referred to as an "OPERATIONS" linked list. This step is indicated by reference number 76. One or more of the operations stored in the "operations" linked list (usually all), which are immediately applicable, are then displayed on the display area 42*a* as a drop down menu (preferable, but not necessary) as indicated at step 78. Then as shown at step 80, the user or operator chooses one of the displayed mathematical operations (including transformations such as factoring, expansion, completing a square, etc.) to be applied or used to operate on the selected problem or mathematical expression. The calculator then operates on the problem with the chosen operation as shown at step 82 and displays the result or effect of the operation on the problem as indicated at step 84. It is again noted that "OPERATIONS" choices may be displayed at step 78, which will operate on or transform the problem, but will not move the problem toward a solution. This allows the student to observe and evaluate the effect of an "unwise" choice. Then as shown at logic block 86, the calculator will evaluate the problem after being subjected to the chosen operation and determine if further operations available in the master group will lead to further solution of the problem.

If the determination is "NO" as shown at 88, the results displayed at step 84 will be the final solution. However, if the determination is "YES" as shown at 90, the results displayed at 86 will now be considered to be the problem to be solved, and the steps 74 through 84 will be repeated as indicated by return loop 92. This process can, of course, be repeated as often as necessary until a final solution is determined.

Although the present invention has been described in detail, it should be understood that various changes, substitutions and alterations could be made to the subject matter of this invention without departing from the spirit and scope as defined by the dependent claims.

What is claimed is:

1. A hand-held computing device for teaching procedures, comprising a sequence of mathematical operations for solving mathematical problems, comprising:

a processor for performing mathematical operations;

a memory including first areas for storing a master group of mathematical operations for solving mathematical problems, which operations are performable by said processor, said memory further including second areas for storing a "problem" linked list of mathematical problems which includes algebraic expression, said "problem" linked list comprising a first data set, said memory further including a third area for storing a mathematical "operations" linked list of selected ones of said master list of mathematical operations applicable to a selected mathematical problem of said "problem" linked list, said "operations" linked list not limited to a mathematical operation which leads to a solution of said selected mathematical problems;

a display for displaying multi-lines of information including said selected mathematical problem and said "operations" linked lists of mathematical operations related to said selected mathematical problem; and an input device for inputting information related to mathematical problems and for selecting a mathematical operation to be performed on a selected mathematical problem from said mathematical "operations" linked list.

2. The computing device of claim 1 and further comprising an input/output port for sending and receiving data.

3. The hand-held computing device of claim 1 wherein said memory includes further area for storing additional linked lists of mathematical problems which include algebraic equations, each additional linked list comprising a different data set.

4. The hand-held computing device of claim 1 wherein said display provides menus, and a user may manipulate different problem data sets in response to said menus.

5. The hand-held device of claim 4 wherein manipulating said problem set includes opening a problem data set, creating a new problem data set, and saving the problem data set under a new name.

6. The hand-held computing device of claim 5 wherein said display further provides menu items for deleting problems, adding problems, or changing problems listed in an open problem data set.

7. A method of operating a hand-held computing device having a multi-line display, a processor, a keyboard and memory for teaching procedures, comprising a sequence of mathematical operations for solving mathematical problems, comprising the steps of:

determining a master group of mathematical operations performable by said processor;

storing at least one "problem" linked list of mathematical problems as a problem data set in said memory;

selecting one of said mathematical problems from said at least one "problem" linked list for solving;

displaying said selected mathematical problem on said display;

storing as a mathematical "operations" linked list, mathematical operations from said master group which are applicable to said selected mathematical problem;

displaying selected mathematical operations from said mathematical operations-linked list, said selected displayed mathematical operations being immediately operable on said selected mathematical problem and not limited to mathematical operations which always lead to a solution of said selected mathematical problem;

choosing one of said displayed mathematical operations;

operating on said selected mathematical problem with said chosen mathematical operation; and displaying the results of applying said chosen mathematical operation to said selected mathematical problem.

8. The method of claim 7 and comprising the further steps of selecting the displayed results as the mathematical problem to be solved and then repeating the steps of "displaying said mathematical problem through the step of "displaying the results."

9. The method of claim 7 wherein said hand-held computing device includes an input/output port and further comprising the steps of providing a connection between said hand-held computing device and another computing device and then receiving said mathematical problems in said problem-linked list from said another computing device.

10. The method of claim 7 wherein said hand-held computing device includes and input/output port and further comprises the steps of providing a connection between said hand-held computing device and another computing device and then exchanging data there between.

11. The method of claim 7 and further comprising the steps of providing said hand-held computing device.

12. The method of claim 11 wherein said step of providing a hand-held computing device comprises the step of providing a device selected from the group of devices including TI-89 and TI-92 Plus.

13. The method of claim 7 and further comprising the steps of storing at least two "problem" linked lists of mathematical problems as additional problem data sets and selecting one of at least two said problem data sets as the source of problems to be solved.

14. The method of claim 13 and further comprising changing the selected problem data set by deleting problems from said selected problem set or adding problems to said selected problem set.

15. The method of claim 13 and further comprising the steps of transforming one or more problems from at least one of said problem data sets to another one of said problem data sets.

16. A method of operating a hand-held computing device having a multi-line display, a processor, a keyboard and memory for teaching procedures for solving mathematical problems comprising the steps of:

storing at least one "problem" linked list of mathematical problems as a problem data set in said memory;

determining a master group of mathematical operations performable by said processor and applicable to a selected mathematical problem of said "problem" linked list, and storing said master group as a linked list;

selecting one of said mathematical problems from said at least one "problem" linked list for solving;

displaying said selected mathematical problem on said display;

choosing a mathematical operation from said stored master group;

operating on said selected mathematical problem with said chosen mathematical operation; and displaying the results of applying said chosen mathematical operation to said selected mathematical problem.

17. The method of claim 16 and comprising the further steps of selecting the displayed results as the mathematical problem to be solved and then repeating the steps of "displaying said selected mathematical problem" through the step of "displaying the results."

18. The method of claim 16 wherein said hand-held computing device includes an input/output port and further comprising the steps of providing a connection between said hand-held computing device and another computing device and then receiving said mathematical problems in said "problem" linked list from said another computing device.

19. The method of claim 16 wherein said hand-held computing device includes an input/output port and further comprises the steps of providing a connection between said hand-held computing device and another computing device and then exchanging data there between.

20. The method of claim 16 wherein said hand-held computing device comprises a device selected from the group of devices including TI-89 and TI-92 Plus.

21. The method of claim 16 and further comprising the steps of storing at least two "problem" linked lists of mathematical problems as additional problem data sets and selecting one of at least two said problem data sets as the source of problems to be solved.

22. The method of claim 21 and further comprising changing the selected problem data set by deleting problems from said selected problem set or adding problems to said selected problem set.

23. The method of claim 21 and further comprising the steps of transforming one or more problems from at least one of said problem data sets to another one of said problem data sets.

* * * * *